United States Patent
Haas et al.

(10) Patent No.: US 11,813,900 B2
(45) Date of Patent: Nov. 14, 2023

(54) HOUSING FOR A TYRE PARAMETER MONITORING SYSTEM, TYRE PARAMETER MONITORING SYSTEM AND METHOD FOR MOUNTING A TYRE PARAMETER MONITORING SYSTEM TO A RIM OF A WHEEL

(71) Applicant: Continental Automotive GmbH, Hannover (DE)

(72) Inventors: Thomas Haas, Donaustauf (DE); Paul Druta, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 177 days.

(21) Appl. No.: 17/309,569

(22) PCT Filed: Nov. 27, 2019

(86) PCT No.: PCT/EP2019/082666
§ 371 (c)(1),
(2) Date: Jun. 4, 2021

(87) PCT Pub. No.: WO2020/114844
PCT Pub. Date: Jun. 11, 2020

(65) Prior Publication Data
US 2022/0024265 A1   Jan. 27, 2022

(30) Foreign Application Priority Data

Dec. 5, 2018 (EP) ..................................... 18465628
Jan. 8, 2019 (GB) ..................................... 1900226

(51) Int. Cl.
*B60C 23/04* (2006.01)
*B60C 29/02* (2006.01)

(52) U.S. Cl.
CPC .......... *B60C 23/0494* (2013.01); *B60C 29/02* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 7,059,178 B2 * 6/2006 Fischer ............... B60C 23/0408
340/447
7,395,702 B2 7/2008 Qiu et al.
(Continued)

FOREIGN PATENT DOCUMENTS

| CN | 203752809 U | 8/2014 |
| CN | 204623029 U | 9/2015 |

(Continued)

OTHER PUBLICATIONS

Great Britain Combined Search and Examination Report dated Jun. 14, 2019 for the counterpart Great Britain Patent Application No. GB1900226.0.
(Continued)

*Primary Examiner* — Andre J Allen

(57) ABSTRACT

A housing (4) for a tyre parameter monitoring system is provided. The housing (4) comprises two arms (10, 12) that are shaped and spaced to provide a clamp-in fitting (18) for engaging with a valve stem (34) of a clamp-in type valve (30) such that the valve stem (34) of the clamp-in type valve (30) is pivotably engaged with the housing (4) and such that the angle between the valve stem (34) of the clamp-in type valve (30) and the housing (4) is variable. The housing (4) also comprises a snap connection fitting (16) for engaging a
(Continued)

valve stem (8) of a snap-in type valve (6). The snap connection fitting (16) is positioned between the two arms (10, 12).

9 Claims, 2 Drawing Sheets

(58) Field of Classification Search
CPC . B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0449; B60C 23/0427; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0045; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.5
See application file for complete search history.

(56) References Cited

U.S. PATENT DOCUMENTS

| | | | |
|---|---|---|---|
| 8,286,474 B2 | 10/2012 | Kempf et al. | |
| 8,327,700 B2 | 12/2012 | Nagora et al. | |
| 8,490,479 B2 | 7/2013 | Cazzanti et al. | |
| 8,839,667 B2* | 9/2014 | Kempf | B60C 23/0494 |
| | | | 73/146.8 |
| 9,744,819 B2* | 8/2017 | Gosi | B60C 29/02 |
| 11,602,958 B2* | 3/2023 | Druta | B60C 23/0494 |
| 2007/0295076 A1* | 12/2007 | Blossfeld | B60C 23/0408 |
| | | | 73/146.8 |
| 2012/0118057 A1* | 5/2012 | Rigney | B60C 23/0494 |
| | | | 73/146.8 |
| 2012/0312089 A1 | 12/2012 | Li | |
| 2015/0000763 A1 | 1/2015 | Konstantin | |
| 2017/0043462 A1 | 2/2017 | Brebant | |
| 2017/0241566 A1* | 8/2017 | Taki | B60C 23/0488 |
| 2019/0030966 A1 | 1/2019 | Arnoldo | |
| 2019/0270351 A1* | 9/2019 | Peedikakkandy | B60C 29/02 |
| 2021/0252922 A1* | 8/2021 | Barbalata | B60C 29/02 |

FOREIGN PATENT DOCUMENTS

| | | |
|---|---|---|
| CN | 207241323 U | 4/2018 |
| DE | 19610376 | 9/1997 |
| DE | 102014119430 A1 | 6/2016 |
| EP | 2818506 A1 | 12/2014 |
| JP | 2015042543 A | 3/2015 |
| WO | 2017153071 A1 | 9/2017 |
| WO | 2018078576 A1 | 5/2018 |

OTHER PUBLICATIONS

International Search Report and the Written Opinion of the International Searching Authority dated Feb. 14, 2020 for the counterpart PCT Application No. PCT/2019/082666.
Great Britain Examination Report dated Dec. 7, 2020 for the counterpart Great Britain Patent Application No. GB1900226.0.
Great Britain Intention to Grant dated Apr. 6, 2021 for the counterpart Great Britain Patent Application No. GB1900226.0.

(56) References Cited

OTHER PUBLICATIONS

European Search Report dated Jun. 12, 2023 for the counterpart Eurpean Patent Application No. 19832288.5.

\* cited by examiner

HOUSING FOR A TYRE PARAMETER MONITORING SYSTEM, TYRE PARAMETER MONITORING SYSTEM AND METHOD FOR MOUNTING A TYRE PARAMETER MONITORING SYSTEM TO A RIM OF A WHEEL

CROSS-REFERENCE TO RELATED APPLICATIONS

This application is a National Stage Application under 35 U.S.C. 371 of International Application No. PCT/EP2019/082666 filed on Nov. 27, 2019, which claims priority from GB 1900226.0 filed on Jan. 8, 2019, in the Intellectual Property Office of the United Kingdom and EP 18465628.8 filed on Dec. 5, 2018, in the European Patent Office, the disclosures of which are herein incorporated by reference in their entireties.

BACKGROUND

1. Field

Embodiments of the present application relate to a system for measuring one or more parameters, for example tyre pressure, of a tyre fitted to a vehicle wheel.

2. Description of Related Art

Tyre parameter monitoring systems (TPMS) are used to inform the driver of any abnormal variation in the measured parameter, for example tyre pressure. Such systems typically include an inflation valve and an electronic module. The inflation valve is positioned in a bore or hole in the wheel rim and the electronic module is arranged inside the tyre and is coupled with the inflation valve.

One type of tyre parameter monitoring system or tyre pressure monitoring system is known as the snap-in type in which the inflation valve positioned on the outside of the wheel rim extends through a bore in the wheel rim and is connected to an electronic unit positioned on the inside of the wheel rim by a snap-in connection. Snap-in valves commonly include an elastically deformable stem. An example of such a system is disclosed in EP 2 818 506 A1.

Another type of tyre parameter monitoring system is known as the clamp-in type. For the clamp-in type it is possible to fasten the electronic module in various angular positions with respect to the wheel rim thus enabling the system to be mounted on different designs of wheel rim. An example of such a clamp-in system is disclosed in U.S. Pat. No. 7,059,178 B2.

Depending on various factors, either a system of the snap-in type or the clamp-in type may be desirable. In order to simplify assembly and reduce costs, it would be desirable to use components of the tyre parameter monitoring system with both snap-in type and clamp-in type valves.

SUMMARY

According to an aspect of the present application, a housing for a tyre parameter monitoring system, for example a tyre pressure monitoring system, is provided. The housing comprises two arms that are shaped and spaced to provide a clamp-in fitting for engaging with a valve stem of a clamp-in type valve such that the valve stem of the clamp-in valve is pivotably engaged with the housing and such that the angle between the valve stem of the clamp-in type valve and the housing is variable. The housing also comprises a snap connection fitting for engaging a valve stem of a snap-in type valve. The snap connection fitting is positioned between the two arms.

The housing provides two types of fitting: a snap-in fitting and a clamp-in fitting. Therefore, the housing can be used for both snap-in type and clamp-in type valves. Additionally, at least the clamp-in fitting provides a variable angular position between the clamp-in type valve and the housing. This enables the housing and tyre parameter system to be used with different types of wheel rim and different types of tyre which conform to different standards. Thus, the housing can be used in a larger number of installations.

The snap connection fitting is positioned between the arms which cooperate to form the clamp-in fitting. Therefore, the snap connection fitting does not occupy an additional area of the housing which would lead to an increase in the lateral size of the housing. Therefore, the housing is compact and can be used in a larger number of installations with both snap-in type valves and clamp-in type valves. The arms are shaped and spaced to provide the clamp-in connection and also to allow the snap-in connection to be positioned between the arms and spaced at a distance from the two arms. For example, the arms may be shaped such that they are spaced apart by a smaller distance at one position, for example one end, to provide the clamp-in fitting and by a greater distance at a second position to enable the snap-in connection to be positioned between and spaced apart from the two arms. This enables the housing to provide two different connection fittings at two different positions without one connection fitting disrupting or affecting the design and form of the other fitting.

The two arms and the snap-connection fitting may protrude from an upper surface of the housing.

In some embodiments, the two arms cooperate to engage with the clamp-in type valve and provide the clamp-in connection fitting. In some embodiments, each arm comprises a slot in an inner surface, the slots cooperating to engage a valve stem of the clamp-in type valve such that the valve stem is pivotably engaged with the housing. The slots may also have the form of a rail which engages with the valve stem. In some embodiments, the inner surface of each arm includes a protrusion that engages a slot positioned in a connector coupled to the valve stem of the clamp-in type valve in order to pivotably couple the valve stem with the housing.

In some embodiments, the two arms are connected by a web portion forming an aperture. The web portion extends between and substantially perpendicularly to the two arms at one end of the two arms to form a U-shape. The arms and the web portion form a U-shape that laterally surrounds and is spaced apart from the separate snap-connection fitting on three adjoining sides. The web portion may be positioned at the edge of the housing.

The aperture is sized and shaped such that the valve stem of the snap-in type valve or the valve stem of the clamp-in type valve is insertable through the aperture. The aperture may be formed between the upper surface of the housing, the web portion and the two arms or may be defined by the web portion. The web portion may also be described as a mounting plate with the arms forming lateral gusset plates that extend from an inner surface of the web portion at opposing lateral ends of the web portion.

In some embodiments, the web portion comprises one or two slots in an inner surface. The inner surface is the surface of the web portion facing towards the snap connection fitting. The slot or slots engage the valve stem of the clamp-in type valve such that the valve stem is pivotably engaged with the slots. The slots may also have the form of a rail which engages with the valve stem. In some embodiments, the inner surface of the web portion includes a protrusion that engages with a slot positioned in a connector coupled to the valve stem of the clamp-in type valve in order to pivotably couple the valve stem with the housing.

In some embodiments, the slots or rails are arcuate, that is the length of the slot or rail forms a curve. The arcuate slots may engage an arcuate protrusion on the valve stem of the clamp-in type valve such that the valve stem is pivotably engaged with the housing. Alternatively, the arcuate protrusions are positioned in the inner surface of the web portion or arms and the arcuate slots are positioned on the valve stem of the clamp-in type valve such that the valve stem is pivotably engaged with the housing.

In some embodiments, each arm includes a slot in an inner surface or the web portion includes two slots in an inner surface which are adapted to engage with a valve stem of a clamp-in type valve such that the valve stem of the clamp-in type valve is pivotably engaged with the housing. For example, the valve stem may include a longitudinal axis and a bar at one end of the stem that extends perpendicularly to the longitudinal axis. The bar is adapted to be inserted into the slots in the inner surface of the arms or web portion such that the bar is pivotably engaged with the slots and such that the valve stem is positionable at different angular positions with respect to the housing.

In embodiments in which the slots are arcuate, the bar may include arcuate protrusions for engaging with the arcuate slots such that the bar is slidably engaged with the slots and such that the valve stem is positionable at different angular positions with respect to the housing. In embodiments in which the inner surface of the web portion or arms includes arcuate protrusions, the bar may include arcuate slots or rails for engaging with the arcuate protrusions such that the bar is slidably engaged with the protrusions and such that the valve stem is positionable at different angular positions with respect to the housing.

In some embodiments, the snap connection fitting protrudes from an upper surface of the housing and is positioned between and spaced apart from the two arms.

In some embodiments, the arms and the snap connection fitting protrude upwardly from the same surface of the housing. The snap connection fitting and the arms may be formed integrally with and form integral parts of the housing. The snap connection fitting may be spaced apart from inner surfaces of the arms, which face towards one another, by a distance. The protrusions or slots for engaging with the clamp-in valve stem may be positioned in the inner surfaces of the arms and in the gap formed between the inner surface of the arms and the snap connection fitting, i.e. on opposing sides in the gap formed between the side of the snap connection fitting and the inner surface of the respective arm.

In embodiments in which the two arms are connected by a web portion, the snap connection fitting may be spaced apart from the web portion. In some embodiments in which the two arms are connected by a web portion, the arms and the web portion extend upwardly from a surface of the housing and the snap connection fitting protrudes upwardly from the same surface of the housing and is positioned between and spaced part from the arms and is spaced apart from the web portion. The snap connection fitting, the arms and the web portion may be formed integrally with and form integral parts of the housing. The snap connection fitting may be spaced apart from inner surfaces of the arms and the inner surface of the web portion.

The snap connection fitting may be positioned between the protrusions or slots in the inner surface of the web portion that are provided for engaging with the clamp-in valve stem. The snap connection fitting may also be spaced apart from inner surfaces of the arms, which face towards one another, by a distance. The protrusions or slots for engaging with the clamp-in valve stem may be positioned in the web portion within the distance between the inner surfaces of the arms and the snap connection fitting, i.e. on opposing sides in the gap formed between the side of the snap connection fitting and the inner surface of the respective arm.

The snap connection fitting may comprise a member with an opening for accepting a valve stem of a snap-in type valve. The opening may be elongate, for example have a tubular form.

In some embodiments, the valve stem of the snap-in type valve is attachable to the snap connection fitting by a screw. The screw may engage an inner thread of the valve stem to attach the valve stem to the snap connection fitting.

The snap connection fitting may be used to secure the housing to the valve stem of the snap-in type valve and to a rim of the wheel, in particular an inner surface of the rim of the wheel. This enables the system with the housing and a snap-in type valve to be used for different wheel rims and tyres. The snap-in type valve may be mounted at just in one angle with respect to the housing.

A sensor unit may be positioned within the housing. For example, the sensor unit may include a sensor and/or electronics for monitoring a tyre parameter, in particular tyre pressure. The housing including the sensor unit may also be called an electronic module.

A tyre parameter monitoring system is also provided which comprises the housing of any one of the embodiments described herein and either a snap-in type valve or a clamp-in type valve.

In an embodiment, a tyre parameter monitoring system comprises the housing according to any one of the embodiments described herein and a snap-in type valve. The valve stem of the snap-in type valve is adapted to be secured to the snap connection fitting. In some embodiments, the valve stem of the snap-in type valve is adapted to be secured to the snap connection fitting by a screw. For example, the valve stem of the snap-in type valve may comprise an inner thread which engages with the screw in order to secure the snap-in type valve to the snap connection fitting.

In an embodiment, a tyre parameter monitoring system comprises the housing according to any one of the embodiments described herein and a clamp-in type valve. The clamp-in type valve comprises a bar that is adapted to engage with the housing to pivotably engage a valve stem of the clamp-in type valve with the housing such that the angle between the valve stem of the clamp-in type valve and the housing is variable.

In some embodiments, the bar of the clamp-in type valve is adapted to engage with a slot or a protrusion in the housing to pivotably engage a valve stem of the clamp-in type valve with the housing. For example, the bar of the clamp-in type valve comprises protrusions that are sized and shaped to mechanically engage with slots in the housing. In some embodiments, the ends of the bar of the clamp-in type valve each comprise an arcuate protrusion that is sized and shaped to mechanically engage an arcuate slot in the housing. One arcuate slot may be formed in each of the arms of the housing.

In some embodiments, the system further comprises a washer, a seal and a nut for securing the clamp-in type valve to the wheel rim. The outer surface of the valve stem includes a thread for engaging with the nut.

The housing may be mounted to a rim of a wheel using either a snap-in type valve or a clamp-in type valve.

In an embodiment, a method for mounting a tyre parameter monitoring system to a rim of a wheel comprises inserting a valve stem of a snap-in type valve into the housing of any one of the embodiments described herein, securing the valve stem to the snap connection fitting of the housing by a screw to form an assembly, and mounting the assembly on a bore in the rim of the wheel, thereby mounting the snap-in type valve on an outer surface of the rim of the wheel and the housing on an inner surface of the rim of the wheel with a fixed angular position between the housing and the valve stem.

The valve stem may be secured to the snap connection fitting by a screw, for example by engaging the screw with an inner thread of the valve stem that is positioned in an aperture in the snap connection fitting.

In an embodiment, a method for mounting a tyre parameter monitoring system to a wheel rim comprises placing a valve stem of a clamp-in type valve into the clamp-in fitting of the housing of any one of the embodiments described herein to pivotably engage the valve stem of the clamp-in type valve with the housing, placing a washer over the clamp-in type valve, placing a seal over the clamp-in type valve on an outer side of the wheel rim, inserting the valve stem of the clamp-in type valve into a hole in the wheel rim from an inner surface of the wheel rim, and mounting the valve stem on the outer surface of the wheel rim and the housing on the inner surface of the wheel rim by engaging a nut with outer thread of the clamp-in type valve stem such that the angle between the valve stem of the clamp-in type valve and the housing is adapted to the wheel rim.

The angle between the valve stem of the clamp-in type valve and the housing and between the clamp-in type valve and the wheel rim is automatically adapted to the wheel rim due to the pivotable connection between the valve stem and the housing.

BRIEF DESCRIPTION OF THE DRAWINGS

Embodiments will now be described with reference to the drawings, in which.

DETAILED DESCRIPTION

Figure 1:
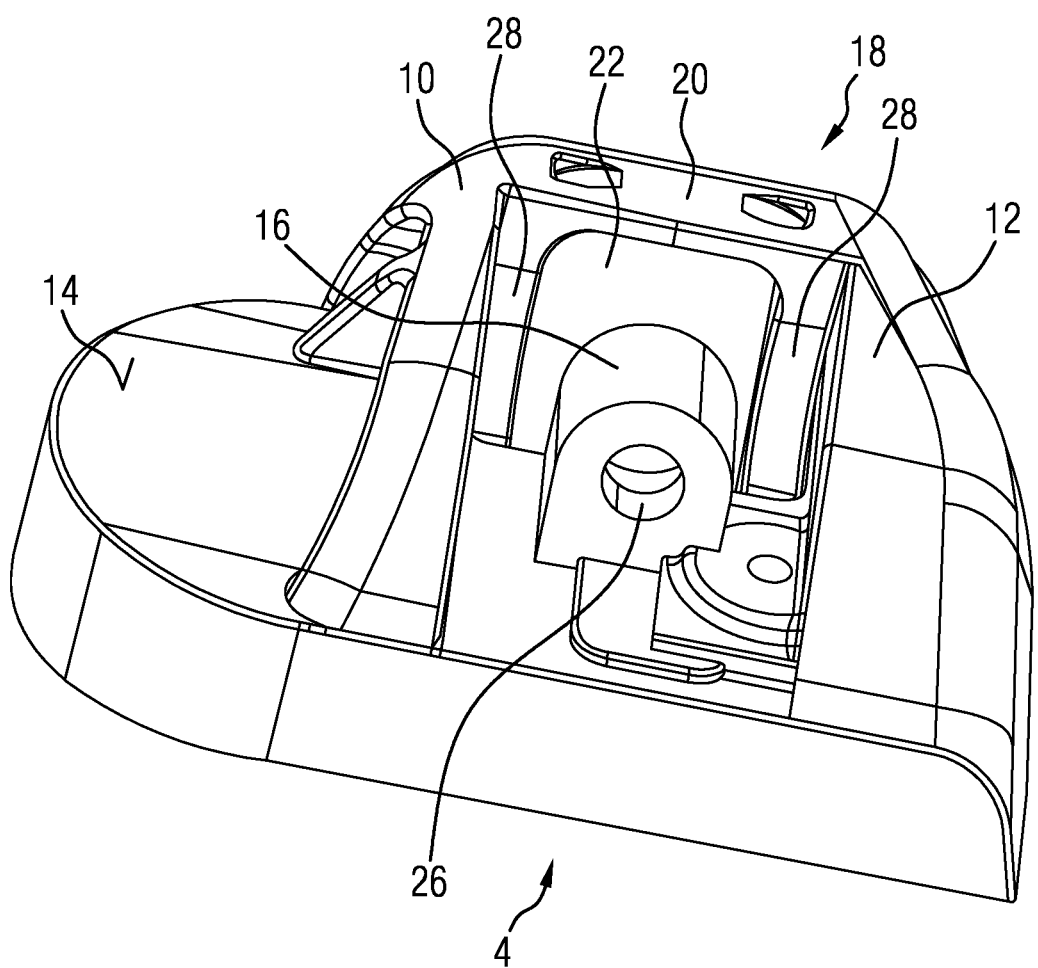
FIG. 1 illustrates a housing for a tyre parameter monitoring system according to an embodiment.

FIG. 1 illustrates a housing 4 of a tyre parameter monitoring system 2. The housing 4 houses a sensor unit for measuring one or more parameters of a tyre, for example tyre pressure. The housing 4 includes two different types of connection fitting, namely a first fitting 16 for engaging with a snap-in type valve and a second fitting 18 for engaging with a clamp-in type valve.

Figure 2:
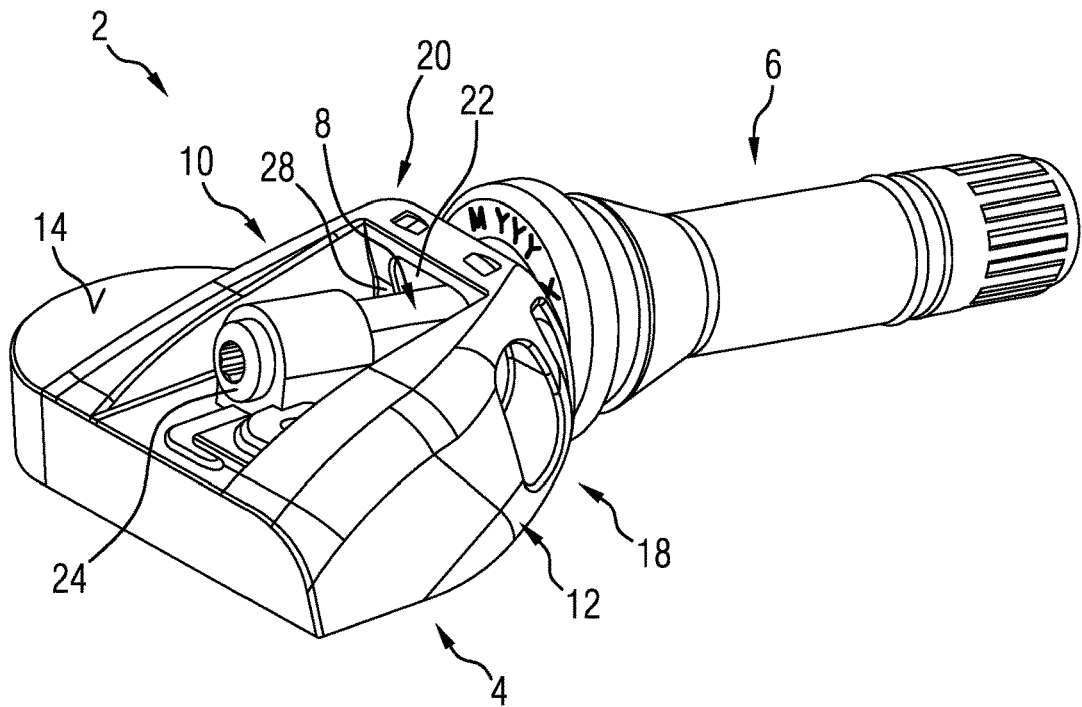
FIG. 2 illustrates a tyre parameter monitoring system including the housing of FIG. 1 and a snap-in type valve.
Figure 3:
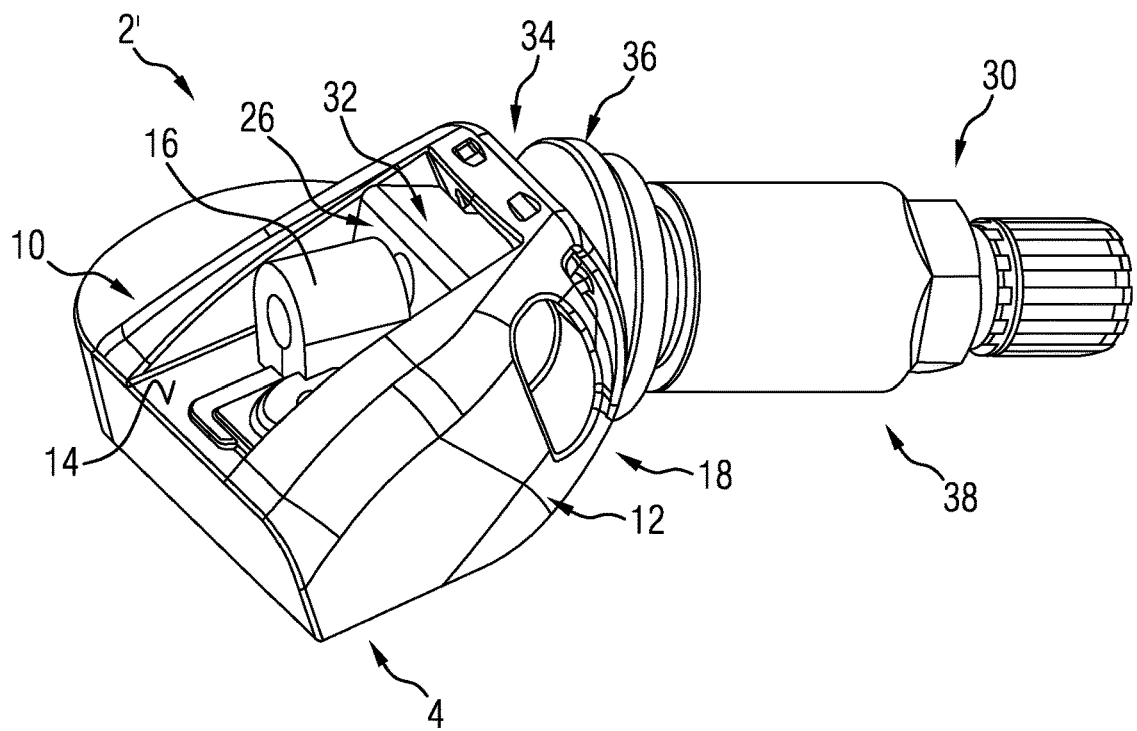
FIG. 3 illustrates a tyre parameter monitoring system including the housing of FIG. 1 and a clamp-in type valve.

FIG. 2 illustrates a tyre parameter monitoring system 2 in the assembled state that includes the housing 4 and a snap-in type valve 6 and FIG. 3 illustrates a tyre parameter monitoring system 2' that includes the housing 4 and a clamp-in type valve 30.

Referring in particular to FIG. 1, the housing 4 includes two arms 10, 12 which extend upwards from an upper surface 14 of the housing 4. The arms 10, 12 may also be considered to be plates or projections extending upwardly from the upper surface 14 of the housing 4. The two arms 10, 12 cooperate to provide the second fitting 18 for engaging with the clamp-in type valve. In particular, each of the arms 10, 12 is shaped and spaced apart from the other so as to provide the second fitting 18 at one end of the arms 10, 12, in particular a peripheral end of the arms 10, 12 positioned at the edge of the upper surface 14 of the housing 4.

The arms 10, 12 are connected by a web portion 20 which extends substantially perpendicularly between the arms 10, 12 at the peripheral end of the arms 10, 12 at the edge of the upper surface 14 of the housing 4. The web portion forms an aperture 22 which is sized and shaped such that a valve stem 8 of the snap-in type valve 6 and a valve stem 34 of the clamp-in type valve 30 can be inserted into the aperture 22 and be positioned between the arms 10, 12 without making contact with the aperture 22. The aperture 22 may be defined by the upper surface 14 of the housing, the web portion 20 and the arms 10, 12. In other embodiments, the web portion 20 may include the aperture 22. The web portion 20 may be called a mounting plate and the arms 10, 12 may be called lateral gusset plates that provide support for the web portion 20. The arms 10, 12 and the web portion 20 form a U-shape and laterally surround the first fitting 16 on three sides.

The housing 4 includes at least one slot 28 in an inner surface of the web portion 20 or an inner surface of the arms 10, 12. The slot or slots 28 are sized, shaped and arranged so as to cooperate to provide a fitting for a clamp-in type valve 30, as is illustrated in FIG. 3 for the tyre parameter monitoring system 2'. The slots 28 may be considered to be rails. In some embodiments, the slots 28 are arcuate in order to pivotably engage the valve stem 34 of the clamp-in type valve 30 with the housing 4.

The clamp-in type valve 30 includes a bar 32 which extends substantially perpendicularly to a longitudinal axis of the valve stem 34 of the clamp-in type valve 30 and which includes protrusions that are sized and shaped to mechanically engage with the slots 28 in order to pivotably couple the clamp-in type valve 30 to the housing 4. The protrusions may be arcuate so as to slidably engage the slots 28 and pivotably couple the clamp-in type valve 30 to the housing 4. The bar 32 can be positioned between the arms 10, 12 in the slots 28 such that the valve stem 34 of the clamp-in type valve 30 extends through the aperture 22 in the web portion 20 and the bar 32 is pivotally coupled to the inner surface of the arms 10, 12 or web portion 20 of the housing 4 such that the angle between the valve stem 34 and the housing 4 is variable.

The first fitting 16 is spaced apart from the web portion 20 by a distance such that the bar 32 is positioned between and does not make contact with the first fitting 16.

The tyre parameter monitoring system may also include a washer, a seal 36 and a nut 38 for securing the housing 4 and the clamp-in type valve 30 to a wheel rim.

Referring to FIGS. 1 and 2, the first connection fitting 16 for engaging with a snap-in type valve is a snap-in fitting and protrudes upwards from the upper surface 14 of the housing 4 and is positioned between and spaced apart from the arms 10, 12 and from the web portion 20. The first fitting 16 may include an aperture 26 which may be elongate and have a tubular shape. The aperture 26 is sized and shaped to accommodate the valve stem 8 of the snap-in type valve 6. The valve stem 8 is inserted through the aperture 22 in the web portion 20 and into the aperture 26 of the first fitting 16 and is secured to the first fitting 16. In this embodiment, the valve stem 8 is secured to the first fitting 16 by a screw 24. The screw 24 is positioned on an opposing side of the first fitting 16 to the valve stem 8 and engages an inner thread of the valve stem 8 to secure the valve stem 8 to the first fitting 16. The valve stem 8 is secured at one fixed angular position with respect to the first fitting 16 and the housing 4.

The housing 4 can be used for both snap-in type valves and clamp-in type valves. Additionally, the housing provides a variable positioning, in particular, different angular positions between the housing 4 and the clamp-in type valve 30. The tyre parameter monitoring system 2 can therefore be used with different types of wheel rims and wheel rims that conform to different standards.

For a snap-in type valve, a method for mounting the tyre parameter monitoring system 2 to a rim of a wheel may include inserting a valve stem 8 of the snap-in type valve 6 through the aperture 22 in the web portion 20 and into the aperture 26 of the first fitting 16 and securing the valve stem 8 to the first fitting 16 of the housing by the screw 24 which engages with a thread on the valve stem 8. The housing is mounted on a bore in an inner surface of the rim of the wheel, and therefore within the tyre when the tyre is fitted to the wheel, with a fixed angular position between the housing 4 and the valve stem 8.

For a clamp-in type valve, a method for mounting a tyre parameter monitoring system 2' to a rim of a wheel may include inserting the valve stem 34 through the aperture 22 from the inner surface and placing the valve stem 34 of the clamp-in type valve 30 into the arms 10, 12 of the housing 4 to pivotably engage the valve stem 34 of the clamp-in type valve 30 with the housing 4. In particular, the bar 32 is inserted into the slots 28 to pivotably engage the bar 32 with the slots 28 and pivotably engage the valve stem 34 of the clamp-in type valve 30 with the housing 4. A washer and a seal 36 are assembled onto the clamp-in type valve 30. The valve 30 is inserted into a hole in the wheel rim from the inner surface of the wheel rim, and the valve stem 34 is secured to the outer surface of the rim and the housing 4 to the inner surface of the rim by engaging a nut 38 with outer thread of valve 30 such that the angle between the valve stem 34 of the clamp-in type valve 30 and the housing 4 is automatically adapted to the shape of the wheel rim.

The invention claimed is:

1. A housing for a tyre parameter monitoring system, the housing comprising:
   a first lateral gusset plate and a second lateral gusset plate configured to provide a clamp-in fitting for engaging with a valve stem of a clamp-in type valve;
   a mounting plate connecting the first lateral gusset plate and the second lateral gusset plate, the mounting plate extending perpendicularly between the first lateral gusset plate and the second lateral gusset plate;
   a first arcuate rail and a second arcuate rail disposed on an inner surface of the mounting plate or an inner surface of the first lateral gusset plate and the second lateral gusset plate, the first arcuate rail and the second arcuate rail configured to pivotably engage the valve stem of the clamp-in type valve such that an angle between the valve stem of the clamp-in type valve and the housing is variable; and
   a snap connection fitting for engaging a valve stem of a snap-in type valve, snap connection fitting positioned between and spaced apart from an aperture formed from the mounting plate, the first lateral gusset plate, and the second lateral gusset plate.

2. The housing according to claim 1, further comprising an upper surface from which the first lateral gusset plate and the second lateral gusset plate protrude,
   wherein the snap connection fitting protrudes from the upper surface of the housing.

3. The housing according to claim 2, wherein the aperture is sized and shaped such that the valve stem of the snap-in type valve or the valve stem of the clamp-in type valve is insertable through the aperture.

4. The housing according to claim 3, wherein the first arcuate rail and the second arcuate rail are configured to engage a bar of the valve stem of the clamp-in type valve such that the valve stem is pivotably engaged with the housing.

5. The housing according to claim 4, wherein the snap connection fitting comprises an opening configured to accept a valve stem of a snap-in type valve.

6. The housing according to claim 5, wherein the valve stem of the snap-in type valve is attachable to the snap connection fitting by a screw.

7. The housing according to claim 6, further comprising a sensor unit configured to monitor a tyre pressure positioned in the housing.

8. A tyre parameter monitoring system comprising:
   a first lateral gusset plate and a second lateral gusset plate configured to provide a clamp-in fitting for engaging with a valve stem of a clamp-in type valve;
   a mounting plate connecting the first lateral gusset plate and the second lateral gusset plate, the mounting plate extending perpendicularly between the first lateral gusset plate and the second lateral gusset plate;
   a first arcuate rail and a second arcuate rail disposed on an inner surface of the mounting plate or an inner surface of the first lateral gusset plate and the second lateral gusset plate, the first arcuate rail and the second arcuate rail configured to pivotably engage the valve stem of the clamp-in type valve such that an angle between the valve stem of the clamp-in type valve and the housing is variable;
   a snap connection fitting for engaging a valve stem of a snap-in type valve, the snap connection fitting positioned between and spaced apart from an aperture formed from the mounting plate the first lateral gusset plate, and the second lateral gusset plate; and
   the snap-in-type valve, the snap-in type valve comprising a valve stem configured to be secured to the snap connection fitting by a screw.

9. A tyre parameter monitoring system comprising:
   a first lateral gusset plate and a second lateral gusset plate configured to provide a clamp-in fitting for engaging with a valve stem of a clamp-in type valve:
   a mounting plate connecting the first lateral gusset plate and the second lateral gusset plate, the mounting, plate extending perpendicularly between the first lateral gusset plate and the second lateral gusset plate;
   a first arcuate rail and a second arcuate rail disposed on an inner surface of the mounting plate or an inner surface of the first lateral gusset plate and the second lateral gusset plate, the first arcuate rail and the second arcuate rail configured to pivotably engage the valve stem of the clamp-in type valve such that an angle between the valve stem of the clamp-in type valve and the housing is variable;
   a snap connection fitting for engaging a valve stem of a snap-in type valve, the snap connection fitting positioned between and spaced apart from an aperture formed from the mounting plate, the first lateral gusset plate, and the second lateral gusset plate; and the clamp-in-type valve, the clamp-in type valve comprising a bar configured to engage with the first arcuate rail and the second arcuate rail to pivotably engage a valve stem of the clamp-in type valve with the housing such that an angle between the valve stem of the clamp-in type valve and the housing is variable.

* * * * *